United States Patent Office 3,476,708
Patented Nov. 4, 1969

3,476,708
HYDRAZINE-MODIFIED POLYESTER RESINS USEFUL IN INSULATING LACQUERS FOR WIRES
Gerhard Schade, Witten-Bommern, and Franz Blaschke, Witten (Ruhr), Germany, assignors to Dynamit Nobel Aktiengesellschaft, Troisdorf, Germany
No Drawing. Filed Oct. 18, 1967, Ser. No. 676,023
Claims priority, application Germany, Oct. 18, 1966, D 51,334
Int. Cl. C08g 20/30; C09d 3/64
U.S. Cl. 260—75                                    13 Claims

ABSTRACT OF THE DISCLOSURE

A modified polyester resin of terephthalic acid, isophthalic acid, or mixtures thereof, with a glycol and an alcohol containing more than two hydroxyl groups, said resin having hydrazine incorporated therein by condensation. The resin, together with other additives such as a curing agent, is dissolved in an organic solvent to provide a lacquer to be used as an insulation coating for wires.

BACKGROUND OF THE INVENTION

This invention relates to insulating lacquers or varnishes for wires. More particularly, it relates to modified polyester resins of terephthalic and/or isophthalic acid with di- and polyhydric alcohols, to wire insulating varnishes or lacquers made therefrom and to a process for preparing the same.

It is conventional in the art to manufacture lacquers or varnishes for the insulation of wires with a resin component which consists of branched polyesters, containing terminal- and chain-positioned hydroxyl groups, of terephthalic acid, isophthalic acid or mixtures thereof with glycols, preferably ethylene glycol, as well as alcohols containing more than two hydroxyl groups, i.e., polyhydric alcohols such as glycerin, trimethyl propane or pentaerythritol. Because of the ready accessibility of the raw materials required for the manufacture of such polyesters, wire lacquers having the corresponding composition are frequently employed in spite of a number of deficiencies in their applicability. The shortcomings of the wire lacquers containing such polyester resins are, in particular, a relatively low curing rate and a heat shock resistance of the wire insulations produced therewith which does not meet all requirements.

In order to overcome these deficiencies, it has been proposed to employ wire lacquers or varnishes made from polyester resins, but wherein the resins are modified in various ways. Such modifications include polyester resins produced with the use of proportions of various polyfunctional compounds, such as dicarboxylic acids containing imide groups from trimellitic acid anhydride and aromatic diamines or aminocarboxylic acids; hydroxycarboxylic acids containing imide groups from trimellitic acid anhydride and alkanolamines; certain silanes and siloxanes, tris(hydroxyethyl) - isocyanurate; aliphatic diamines, aminocarboxylic acids, or lactams; tris(hydroxymethyl)-aminomethane, etc. Insofar as the previously known modifications of the polyester resins overcome the above-mentioned deficiencies without simultaneously evoking new shortcomings, they have the disadvantage in common that the required starting materials are relatively difficult to obtain and expensive. Accordingly, such modified polyester resins can only be manufactured in an uneconomical manner.

Accordingly, one of the objects of the present invention is to provide wire insulating lacquers or varnishes having advantageous properties and which overcome the deficiencies of the prior art compositions.

Another object of the present invention is to provide a process for preparing lacquers for insulating wires which may be carried out in an efficacious and economical manner.

A further object of the invention is to provide wire insulating lacquers of high quality.

A still further object of the invention is to provide wire insulating lacquers which have an improved abrasion resistance, heat or high temperature shock resistance, and curing and processing speed as well as wire insulations produced therewith which have a resistance to pressure at high temperatures.

Yet another object of the invention is to provide a modified polyester resin having useful properties.

These and other objects and advantages of the present invention will become apparent to those skilled in the art from a consideration of the following specification and claims.

SUMMARY OF THE INVENTION

In accordance with the present invention it has been discovered that wire insulating lacquers containing polyester resins can be improved with respect to the above-mentioned properties by incorporating hydrazine hydrate, or aqueous solutions thereof, into the polyester-based lacquers. These lacquers are produced by concomitantly employing the hydrazine hydrate, or aqueous solutions thereof, during the manufacture of the polyester resins, thereby incorporating hydrazine into the polyester chain by condensation.

Accordingly, the present invention relates to modified polyester resins and to wire lacquers or varnishes made therefrom, comprising modified polyester resins of terephthalic acid, isophthalic acid, or mixtures thereof, with glycols, as well as more than dihydric (polyhydric) alcohols, and conventional solvents, hardeners and, if desired, further additives, wherein the polyester resins contained in these lacquers have hydrazine condensed therein.

It is known in the art that when hydrazine or hydrazine hydrate is reacted with compounds containing ester bonds that the latter are split open, there being produced, in the case of oligomeric polyesters, products containing hydrazide terminal groups and hydroxyl terminal groups. These cleavage products are capable of polycondensation—if desired, after the water introduced with the hydrazine hydrate has been removed— with glycol being split off or released, as long as there are still terminal glycol ester groups present. The macromolecules present thereafter have, as the functional groups, essentially terminal-positioned hydrazide groups and chain-positioned hydroxyl groups. Upon further heating, at the latest under the baking conditions, a lengthening of the chains of the macromolecules occurs by cyclization of the two hydrazide terminal groups to give a disubstituted aminotriazole as follows:

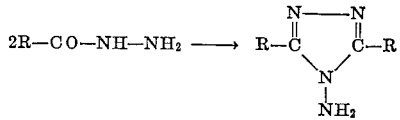

wherein R represents a hydrazide group. In addition thereto, a correspondingly substituted oxydiazole is also produced to a small extent, as shown below, since there is observed a loss of 5–10% by weight of the hydrazine employed during the polycondensation reaction, including the baking process:

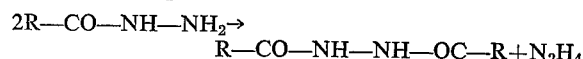

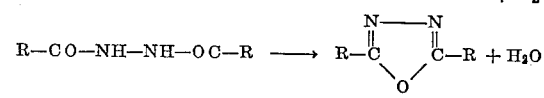

The nitrogen content of the polycondensates of this invention is in the range of 0.5 to 10% by weight, preferably 2 to 6% by weight.

Linear, high molecule weight polycondensates containing only groups of this type in the macromolecule have never been recommended heretofore for the purpose of insulating electrical conductors. Moreover, the incorporation of heterocyclic ring systems of the above-disclosed type into polymers containing ester groups has not been suggested previously. Likewise, it could not be foreseen that incorporation of such groups into the conventional polyester resins could impart to the lacquers or varnishes, or wire insulations produced therefrom, substantially improved properties in their technical applicability.

Except for the above-described chain lengthening resulting from the creation of heterocyclic ring systems, the curing process takes place in the manner customarily used with the conventional polyester resins by way of the predominantly chain-positioned hydroxyl groups by means of conventional curing agents, such as alkyl and aryl titanates, polyisocyanate cleaving agents and metal salts of organic acids.

The resins contained in the wire insulating lacquers having the composition of the present invention are obtained in a particularly simple and economical manner by first esterifying terephthalic acid or isophthalic acid, or mixtures thereof, with a mixture of a glycol and a polyhydric alcohol or by transesterifying lower alkyl esters of the above-mentioned acids with the polyalcohol mixture. Then, the hydrazine hydrate, or an aqueous solution therof, preferably an approximately 80% by weight solution, is added thereto. The mixture is then refluxed for at least about 3 hours, and the water is therafter distilled off. The mixture is then maintained at a temperature of approximately 230° to 265° C. until the melt has reached the desired degree of polycondensation. It is also possible to react an unmodified polyester resin, which has been polycondensed to a greater or lesser extent, with hydrazine hydrate in the above-described manner and then again to polycondense the product of that reaction. Additional possibilities of how to produce the resin employed in the present invention can be seen from the examples set forth hereinbelow.

EXAMPLES

The following examples are given merely as illustrative of the present invention and are not to be considered as limiting. Unless otherwise noted, the percentages therein and throughout the application are by weight.

The test results set forth in the examples were obtained as described immediately hereafter.

An oven was employed having a length of 2.5 meters. The baking temperature was 450° C., the bare wire had a diameter of 0.60 mm., and dipping was executed six times, whereupon the varnish coating had a thickness of 35-40μ (1μ=1 micron=1/1000 mm.).

The processing speed was varied. Only the results of the most favorable processing speed in each case are shown.

The test for abrasion resistance was conducted according to NEMA/MW 55-1955 (number of double strokes at a load of 405 grams).

The coil turn test was made at a 25% pretensioning (preliminary elongation), 1000 g. load and a coiling speed of 280 r.p.m. The results shown indicate at what diameter of the mandrel (expressed as one bare-wire diameter or a multiple thereof) that there was not yet any damage to the layer of lacquer.

Aging under heat was conducted over a period of 50 hours at 200° C., after which it was determined at what mandrel diameter there was not yet any damage to the layer of lacquer when the aged wire was wound, at a load of 100 g. and at a speed of 280 r.p.m.

The heat shock resistance was determined by producing coiled turns with one mandrel diameter, at a load of 100 g. with 280 r.p.m., and subjecting these turns for 15 minutes to various temperatures. The boundary or threshold temperature at which there was barely no damage as yet to the lacquer film is indicated.

The resistance to pressure under heat was determined according to DIN (German Industrial Standard) 46, 453, Draft of April 1965, at a load of 800 grams.

COMPARATIVE EXAMPLE

This example represents the prior art and not the present invention.

Within eight hours, at 145–220° C., 445 parts by weight of dimethyl terephthalate, 119.6 parts by weight of glycerin, 87 parts by weight of ethylene glycol and 1.6 parts by weight of lead octoate were transesterified under a nitrogen atmosphere, 148 parts by weight of methanol passing over. Thereafter, the temperature was increased to 240° C. and maintained there for four hours. The final product exhibited the following characteristic data:

| | |
|---|---|
| Acid number | 4.7 |
| Saponification number | 515 |
| Hydroxyl number | 210 |
| Viscosity value | [1] 0.132 |

[1] Measured with 1% by weight of resin in a 60/40 by weight mixture of phenol/tetrachloroethane at 25° C.

A wire lacquer was prepared with the resultant polyester resin using the following formulation:

| | Parts by weight |
|---|---|
| Resin | 35.0 |
| Cresol (30 H) (light, 30% meta-cresol) | 50.0 |
| Xylene | 10.0 |
| Ethylene glycol | 5.0 |
| 50% solution of polymeric butyl titanate in cresol (30 H) | 1.4 |

The lacquered or varnished wire prepared therefrom exhibited the following characteristic data:

| | |
|---|---|
| Processing speed | 9 m./min. |
| Abrasion resistance | 88. |
| Coil turns | 2×φ. |
| High temperature aging | 1×φ. |
| Heat shock resistance | 180° C. |
| High-temperature pressure resistance | 280° C. |

(φ=diameter.)

EXAMPLE 1

The resin described in the above comparative example (400 parts by weight) was melted at 150° C. Gradually added dropwise thereto was 25 parts by weight of an 80% hydrazine hydrate solution. The reaction mixture was then refluxed for three hours. Thereafter, water, at first, and then glycol were distilled off until a product temperature of 250° C. was reached. After four hours at 250° C., the resin had a viscosity number of 0.15, an acid number of 17, a saponification number of 446, an hydroxyl number of 195 and a nitrogen content of 2.9%.

A lacquer was prepared in accordance with the same formulation shown in the comparative example hereinabove.

The lacquered wire prepared using the above lacquer formulation showed the following characteristics:

| | |
|---|---|
| Processing rate | 11 m./min. |
| Abrasion resistance | 110. |
| Coil turns | 2×φ. |
| High temperature aging | 1×φ. |
| Heat shock resistance | 220° C. |
| High-temperature pressure resistance | 280° C. |

EXAMPLE II

Within eight hours, 445 parts by weight of dimethyl terephthalate, 119.6 parts by weight of glycerin, 87 parts by weight of ethylene glycol, 0.1 part by weight of lead octoate and 0.4 part by weight of tetrabutyl titanate were transesterified at 145–220° C. After cooling to 165° C., 26 parts by weight of an 80% hydrazine hydrate solution was added thereto dropwise, and the reaction mixture was refluxed for three hours. Then, the same procedure was followed as described in Example I. The viscosity number of the resultant modified polyester resin was 0.150 and the nitrogen content thereof was 2.4%.

A lacquer was prepared with this modified polyester resin with the same formulation as described in the Comparative Example.

The lacquered or varnished wire prepared from this lacquer formulation exhibited the following characteristics:

| | |
|---|---|
| Processing speed | 11 m./min. |
| Abrasion resistance | 100. |
| Coil turns | 1×φ. |
| High temperature aging | 1×φ. |
| Heat shock resistance | 220° C. |
| High-temperature pressure resistance | 270° C. |

EXAMPLE III

The following components were treated as described in Example II.

| | Parts by weight |
|---|---|
| Dimethyl terephthalate | 454.0 |
| Glycerin | 119.6 |
| Ethylene glycol | 87.0 |
| Lead oxide | 0.1 |
| Butyl titanate | 0.2 |

Then, 52.0 parts by weight of an 80% hydrazine hydrate solution was added, and the mixture was refluxed for three hours on a reflux condenser. The procedural steps described in Example I were then carried out. The resultant modified polyester resin had a viscosity value of 0.162 and a nitrogen content of 4.33%.

Using the same lacquer formulation as described in the comparative example, a lacquered wire was prepared. It showed the following characteristics:

| | |
|---|---|
| Processing speed | 12 m./min. |
| Abrasion resistance | 196. |
| Coil turns | 1×φ. |
| High temperature aging | 2×φ. |
| Heat shock resistance | 220° C. |
| High-temperature pressure resistance | 280° C. |

EXAMPLE IV

The following components were treated as described in Example II:

| | Parts by weight |
|---|---|
| Dimethyl terephthalate | 454.0 |
| Glycerin | 119.6 |
| Ethylene glycol | 87.0 |
| Lead oxide | 0.1 |

Thereafter, 56 parts by weight of an 80% hydrazine hydrate solution was added, and the reaction mixture was boiled for three hours on a reflux condenser. Then, the same procedure as described in Example I was effected. The resultant polyester resin had a viscosity number of 0.142 and a nitrogen content of 4.9%.

Using the same formulation as described in the comparative example, a lacquer was prepared. A wire treated with this lacquer showed the following characteristics:

| | |
|---|---|
| Processing speed | 12 m./min. |
| Abrasion resistance | 285. |
| Coil turns | 2×φ. |
| High temperature aging | 2×φ. |
| Heat shock resistance | 240° C. |
| High-temperature pressure resistance | 270° C. |

EXAMPLE V

The following components were treated as described in Example II:

| | Parts by weight |
|---|---|
| Dimethyl terephthalate | 418.0 |
| Glycerin | 92.0 |
| Ethylene glycol | 92.0 |
| Lead oxide | 0.1 |
| Butyl titanate | 0.2 |

Subsequently, 68 parts by weight of an 80% hydrazine hydrate solution were added, and the reaction mixture was boiled for five hours on a reflux condenser. Thereafter, the same procedure was followed as described in Example I. The resultant resin had a viscosity number of 0.192 and a nitrogen content of 6.1%.

A lacquer was prepared using the same formulation as described in the comparative example. A varnished wire prepared therefrom exhibited the following characteristics:

| | |
|---|---|
| Processing speed | 13 m./min. |
| Abrasion resistance | 100. |
| Coil turns | 1×φ. |
| High temperature aging | 2×φ. |
| Heat shock resistance | 240° C. |
| High-temperature pressure resistance | 260° C. |

Many other examples of lacquer formulations could be shown, but these are considered to be redundant as lacquer formulation per se is well known in the art. Solvents which may be employed include, for example, aromatic hydrocarbons such as the cresols, xylene, aromatic hydrocarbon cuts from petroleum (such as solvent naphtha) and the like. The same is true of the curing agent or other additives, as desired, since these are conventional and any of those conventionally employed may be used in the present invention.

It is to be understood that the viscosity values or numbers shown above refer to the "reduced viscosity" as this expression is known in the art.

The amount of hydrazine to be added to the polyesters during the preparation of the modified polyesters corresponds roughly to the nitrogen content of the resultant polyester, i.e., about 0.5 to 10% by weight, preferably 2 to 6% by weight.

The invention being thus described, it will be obvious that the same may be varied in many ways. Such variations are not to be considered as a departure from the spirit and scope of the invention and all such modifications are intended to be included within the scope of the following claims.

We claim:

1. A modified polyester resin of terephthalic acid, isophthalic acid, or mixtures thereof, with a glycol and an alcohol containing more than two hydroxyl groups, said resin having hydrazine incorporated therein by condensation.

2. The resin of claim 1, wherein said resin contains from 0.5 to 10% by weight of chemically bound nitrogen.

3. The resin of claim 1, wherein said resin contains from 2 to 6% by weight of chemically bound nitrogen.

4. A wire insulating lacquer comprising an organic solvent solution of a modified polyester resin of terephthalic acid, isophthalic acid, or mixtures thereof, with a glycol, an alcohol containing more than two hydroxyl groups and hydrazine and a curing agent therefor.

5. The wire insulating lacquer of claim 4, wherein said resin contains from 0.5 to 10% by weight of chemically bound nitrogen.

6. The wire insulating lacquer of claim 4, wherein said resin contains from 2 to 6% by weight of chemically bound nitrogen.

7. The wire insulating lacquer of claim 4, wherein said glycol is ethylene glycol and the alcohol containing more than two hydroxyl groups is selected from the group consisting of glycerin, trimethylol propane, pentaerythritol and mixtures thereof.

8. A process for the preparation of a modified polyester resin which comprises esterifying terephthalic acid, isophthalic acid, or a mixture thereof, with a mixture of a glycol and an alcohol containing more than two hydroxyl groups, adding thereto hydrazine hydrate or an aqueous solution thereof, refluxing the resultant mixture and distilling off the water and then maintaining the resultant product at an elevated temperature until the desired degree of polycondensation is attained.

9. The process of claim 8, wherein said elevated temperature is approximately 230° to 265° C.

10. A process for the preparation of a modified polyester resin which comprises transesterifying a lower alkyl ester of terephthalic acid, isophthalic acid, or a mixture thereof, with a mixture of a glycol and an alcohol containing more than two hydroxyl groups, adding thereto hydrazine hydrate or an aqueous solution thereof, refluxing the resultant mixture and distilling off the water and then maintaining the resultant product at an elevated temperature until the desired degree of polycondensation is attained.

11. The process of claim 10, wherein said elevated temperature is approxmiately 230° to 265° C.

12. A process for manufacturing a wire containing an insulating lacquer thereon which comprises dipping the bare wire in an organic solvent solution of a modified polyester resin of terephthalic acid, isophthalic acid, or mixtures thereof, with a glycol, an alcohol containing more than two hydroxyl groups and hydrazine and a curing agent therefor, and then baking the wire for a time sufficient to obtain a good adherence between the wire and the lacquer.

13. An insulated wire produced by the process of claim 12.

References Cited
UNITED STATES PATENTS

| | | | |
|---|---|---|---|
| 3,161,541 | 12/1964 | Holub | 117—232 |
| 3,345,429 | 10/1967 | Sattler | 260—860 |
| 3,393,180 | 7/1968 | Thoma et al. | 260—78 |

WILLIAM H. SHORT, Primary Examiner

E. NIELSEN, Assistant Examiner

U.S. Cl. X.R.

117—113, 128.4, 161; 260—33.6, 33.4